United States Patent
Karson et al.

(10) Patent No.: US 10,282,735 B2
(45) Date of Patent: May 7, 2019

(54) COMPUTER BASED SYSTEMS AND METHODS FOR MANAGING ONLINE DISPLAY ADVERTISING INVENTORY

(75) Inventors: Steven R. Karson, Smyrna, GA (US);
Mark G. Smith, Roswell, GA (US);
Michael J. Burgiss, Marietta, GA (US)

(73) Assignee: AutoTrader.com, Inc., Atlanta, GA (US)

(*) Notice: Subject to any disclaimer, the term of this patent is extended or adjusted under 35 U.S.C. 154(b) by 1402 days.

(21) Appl. No.: 12/342,944

(22) Filed: Dec. 23, 2008

(65) Prior Publication Data

US 2010/0161408 A1 Jun. 24, 2010

(51) Int. Cl.
*G06Q 30/00* (2012.01)
*G06Q 30/02* (2012.01)

(52) U.S. Cl.
CPC ........ *G06Q 30/02* (2013.01); *G06Q 30/0244* (2013.01); *G06Q 30/0246* (2013.01); *G06Q 30/0254* (2013.01); *G06Q 30/0264* (2013.01)

(58) Field of Classification Search
USPC ......................................................... 705/14
See application file for complete search history.

(56) References Cited

U.S. PATENT DOCUMENTS

| | | | |
|---|---|---|---|
| 7,085,682 B1 | 8/2006 | Heller et al. | |
| 2003/0023481 A1 | 1/2003 | Calvert et al. | |
| 2004/0093286 A1 | 5/2004 | Cooper et al. | |
| 2004/0138956 A1 | 7/2004 | Main et al. | |
| 2006/0080171 A1 | 4/2006 | Jardins et al. | |
| 2007/0198346 A1* | 8/2007 | Beyda et al. | 705/14 |
| 2007/0271134 A1* | 11/2007 | Ferry et al. | 705/14 |
| 2008/0167948 A1 | 7/2008 | Park | |
| 2010/0114695 A1* | 5/2010 | Veach | 705/14.48 |
| 2010/0114710 A1* | 5/2010 | Agarwal et al. | 705/14.66 |
| 2010/0146531 A1* | 6/2010 | Fu et al. | 725/14 |

FOREIGN PATENT DOCUMENTS

| | | |
|---|---|---|
| KR | 10-2008-0086946 | 9/2008 |
| KR | 10-2008-0091736 | 10/2008 |

OTHER PUBLICATIONS

International Search Report and the Written Opinion of the International Searching Authority in corresponding PCT application PCT/US2009/068952 (Dec. 21, 2009).

* cited by examiner

*Primary Examiner* — Alvin L Brown
(74) *Attorney, Agent, or Firm* — Nixon & Vanderhye P.C.

(57) ABSTRACT

A system and method for determining total capacity, amount reserved or sold and remaining availability of ad impressions for an online advertising publishing system. Calculations may be based on multiple factors including for example 1) actuals of historical data of ad impression delivery, 2) various delivery parameters including ad targeting overlap with other ads, timing, priority and impression goals, and 3) a mathematical algorithm and calculations of the above incorporating adjustments due to seasonality and market factors. The resulting calculations are used to reserve, schedule and target advertisements to be delivered over a network to be viewed by consumers.

13 Claims, 15 Drawing Sheets

FIG. 2A

| Ad Inventory Tool | Query Builder | Retrieve Query | Query Reports | Seasonality | | | Welcome - - - Log out<br>*Better, Faster, Stronger*<br>Home | Support | AutoTrader.com |

Ad Inventory Availability

Conquest 300x250 :: 12/15/2008 - 12/31/2008
findacar::invalidzip, findacar::ispsearchform::srf::nocars, findacar::ispsearchform::srf MSN FIX, findacar::ispsearchform::spa,
findacar::ispsearchform::srf::compare, findacar::ispsearchform::spa, findacar::ispsearchform::srf, 300x250 Square, NTL (↑) New Search  (↑) Refine Search

| For ♦ | Dec 2008 capacity ♦ | Dec 2008 availability ♦ |
|---|---|---|
| Convertible - Compact::ATLANTA::Certified | 55 | 4 |
| Convertible - Compact::ATLANTA::New | 39 | 15 |
| Convertible - Compact::ATLANTA::Used | 3606 | 393 |

Flight Data

| | Advertiser Name | Overlap % | Booked Qty | Start Date | End Date | Order # | Order Name | Flight # | Flight Name | Flight Status |
|---|---|---|---|---|---|---|---|---|---|---|
| Co | Volkswagen of America, Inc.-CPL | 4% | 2,397 | 2008-04-17 | 2008-12-31 | 82374 | 2008 CPL - Volkswagen [BEETLE] | 6 | Retention 300x250 SRP Used_001 | Active |
| Co | Lexus Atlanta | 0% | 578 | 2008-10-01 | 2008-12-31 | 71630 | LDA CPO_Conquest_South_Atlanta | 13 | Conquest 300x250 SRP_004 | Active |
| Co | Atlanta Metro Ford FDAF | 0% | 136 | 2008-12-08 | 2008-12-31 | 70219 | 2008 FDAF Tier 2 Upfront Atlanta Metro | 72 | ROM (Run of Market) 300x250 SF & SRP December_001 | Active |
| Co | Volkswagen of America, Inc.-CPL | 4% | 102 | 2008-04-17 | 2008-12-31 | 82362 | 2008 CPL - Volkswagen [EOS] | 6 | Retention 300x250 SRP Used_001 | Active |

FIG. 2B

| Ad Inventory Tool | Query Builder | Retrieve Query | Query Reports | Seasonality | | Welcome - - - Log out |
|---|---|---|---|---|---|---|
| | | | | | | Better, Faster, Stronger |
| | | | | | | Home \| Support \| AutoTrader.com |

Retrieve Query

Filter query list by: [All Users ▼]

If required fill in the respective values to filter the Column(s) Data:

| User Name ⇕ | Query Name ⇕ | Description ⇕ | |
|---|---|---|---|
| ssmith | 2009 Con Tower Nor Cal | | Delete |
| prtyioran | 2009 GM RET SRP Cap USED | Spotlight & Superliner, by month, by DMA, by Make & Models, by Used | |
| prtyioran | 2009 GM RET SRP Capacity | Spotlight & Superliner, by month, by DMA, by Make & Models, by New/All | |
| prtyioran | 2009 GM RET VDP Cap USED | Tower, by month, by DMA, by Make & Models, by Used | |
| prtyioran | 2009 GM RET VDP Capacity | Tower, by month, by DMA, by Make & Models, by New/All | |
| prtyioran | 2009 Kia Retention | | |
| prtyioran | 2009 LM Models | | |
| kawright | 2009 SET Conquest Bodystl | | |
| kawright | 2009 SET Retention Models | | |
| ssmith | 2009 SRP CONQUEST NOR CAL | | Delete |

«« « 1 2 3 4 5 6 7 8 9 10 » »»

2007 AutoTrader.com, Inc. All Right Reserved. AutoTrader.com is a registered trademark of TPI Holdings, Inc. used under exclusive license.

FIG. 2C

| Ad Inventory Tool | Query Builder | Retrieve Query | Query Reports | Seasonality | | | | | | Welcome - - - Log out |
|---|---|---|---|---|---|---|---|---|---|---|
| | | | | | | | | | | Better, Faster, Stronger |
| | | | | | | | | | | Home \| Support \| AutoTrader.com |

Reports

| QueryRpt_CONQ_728x90_SF ▼ | | | | | | | | |
|---|---|---|---|---|---|---|---|---|
| --Select Report-- | | | | | | | | |
| MAJ Availability Report 2008 | 8:28.0 | | | | | | | |
| QR_CONQ_300X250_SRP | | | | | | | | |
| QueryRpt_CONQ_160X600_VDP | ::728x90:: ♦ | ACURA::728x90:: ♦ | ALFA::728x90:: ♦ | AMC::728x90:: ♦ | AMGEN::728x90:: ♦ | ASTON::728x90:: ♦ | AUDI::728x90:: ♦ |
| QueryRpt_CONQ_300X250_SF | | 55% | 100% | 100% | 100% | 100% | 100% |
| QueryRpt_CONQ_728X90_SF | | 82% | 100% | 100% | 100% | 100% | 100% |
| QueryRpt_CONQ_728x90_SRP | | 83% | 100% | 100% | 100% | 100% | 100% |
| QueryRpt_CONQ_765x125_SRP | | 77% | 100% | 100% | 100% | 100% | 100% |
| QueryRpt_RET_160x600_VDP | | 73% | 100% | 100% | 100% | 100% | 100% |
| QueryRpt_RET_300_&_728_SF | | 79% | 100% | 100% | 100% | 100% | 100% |
| QueryRpt_RET_SRP | | 71% | 100% | 100% | 100% | 100% | 100% |
| ALEXANDRIA_LA | 100% | 89% | 100% | 100% | 100% | 100% | 100% |
| ALPENA | 9% | 82% | 100% | 100% | 100% | 100% | 100% |
| AMRILLO | 100% | 65% | 100% | 100% | 100% | 100% | 100% |
| ANCHORAGE | 0% | 75% | 100% | 100% | 100% | 100% | 100% |
| ATLANTA | 100% | 74% | 100% | 100% | 100% | 100% | 100% |
| AUGUSTA | 100% | 72% | 100% | 100% | 100% | 100% | 100% |
| AUSTIN | 100% | 76% | 100% | 100% | 100% | 100% | 100% |
| BAKERSFIELD | 100% | 71% | 100% | 100% | 100% | 100% | 100% |
| BALTIMORE | 100% | 71% | 100% | 100% | 100% | 100% | 100% |
| BANGOR | 0% | 66% | 100% | 100% | 100% | 100% | 100% |
| BATON_ROUGE | 100% | 73% | 100% | 100% | 100% | 100% | 100% |
| BEAUMONT-PORT_ARTHUR | 100% | 77% | 100% | 0% | 100% | 100% | 100% |
| BEND_OR | 100% | 83% | 100% | 100% | 100% | 100% | 100% |
| BILLINGS | 100% | 79% | 100% | 100% | 100% | 100% | 100% |
| BILOXI-GULFPORT | 100% | 61% | 100% | 100% | 100% | 100% | 100% |
| BINGHAMTON | 0% | | | | | | |

FIG. 2D

| Ad Inventory Tool | Query Builder | Retrieve Query | Query Reports |

Seasonality

Month*  Year*  Month Span*
[Oct ▼]  [2008 ▼]  [12 ▼]  (→FIND)

◉ Current

| Month | Trend | Growth | Total |
|---|---|---|---|
| Oct 2008 | 5 % | 0 % | 5% |
| Nov 2008 | 0 % | 0 % | 0% |
| Dec 2008 | -5 % | 0 % | -5% |
| Jan 2009 | -20 % | 0 % | -20% |
| Feb 2009 | -10 % | 0 % | -10% |
| Mar 2009 | 5 % | 0 % | 5% |
| Apr 2009 | 0 % | 0 % | 0% |
| May 2009 | 0 % | 0 % | 0% |
| Jun 2009 | 0 % | 0 % | 0% |
| Jul 2009 | 5 % | 0 % | 5% |
| Aug 2009 | 10 % | 0 % | 10% |
| Sep 2009 | 5 % | 0 % | 5% |

FIG. 2E

Logical Inventory Availability Seasonality With Total Weight

COMPUTER BASED SYSTEMS AND METHODS FOR MANAGING ONLINE DISPLAY ADVERTISING INVENTORY

CROSS-REFERENCES TO RELATED APPLICATIONS

None.

STATEMENT REGARDING FEDERALLY SPONSORED RESEARCH OR DEVELOPMENT

None.

FIELD

The technology herein relates to computer systems for managing online advertising, and more particularly to online advertising inventory forecasting. In more detail, the technology herein relates to forecasting when advertising capacity is not within a producer's control, or based on a manufactured quantity. The technology further relates to inventory availability when purchases can be satisfied by multiple combinations of differing inventory units.

BACKGROUND AND SUMMARY

Internet and other online advertising continues to grow in value and reach. Unlike advertising distributed over broadcast type media, Internet and other online advertising can be targeted to user inputs or other action and/or information that a website has gotten concerning one or more users (e.g., user profiles). For example, assume a user is interested in purchasing a new car and inputs the search term "Lexus" into a World Wide Web search engine. An advertising targeting and delivery engine can be programmed to deliver, in response to such input, a Lexus dealer's ad for a particular Lexus car on the dealer's lot. If the user inputs the search term "Lexus GS", the ad targeting engine can target and deliver an ad for that specific make and model of car.

Such timely and targeted ad delivery capabilities are very useful and efficient in creating purchasing opportunities. Timely targeted advertising messages are directly relevant and responsive to motivated user requests or other user related event(s) or action(s), and therefore have a higher likelihood of purchasing success than untargeted ads. Therefore, generally speaking, an advertising client will often pay more for targeted impressions than for untargeted impressions served at random to meet quota. Ads can be targeted on a variety of factors. For example, a new or used car dealer who wishes to sell a Mustang convertible sitting on a car lot in Atlanta will pay more for an impression delivered to someone whose search criteria indicate he or she lives in Atlanta and is looking for a Mustang or a convertible. Impressions delivered in response to other types of user requests (e.g., books about cars, Christmas gifts, etc.) are less effective and therefore less valuable to an advertiser client.

Advertising is sold and marketed in a variety of ways. One common way for Internet advertising to be sold and marketed is by guaranteeing an advertising customer a certain number of targeted views/impressions for his or her ad—that is, the total number of times potential customers have seen or viewed a particular ad. This is an easy way for advertising to be priced. Many or most advertising customers are willing to pay fees based on number of "impressions" of the ad that are actually delivered to consumers. Typically, targeted impressions have more value than untargeted ones and therefore command a higher price.

Forecasting in advance the inventory of targeted impressions that will be available in any given time period based on the number of people that view a particular web site (or, for example, a particular location within a particular web site) can be difficult. Unlike broadcast advertising where the number of ads that can be delivered in a television or radio broadcasting hour can be scheduled in advance, online advertisers do not know for sure how many users will view a particular Internet site during a given time period. It is a challenge to accurately predict how many total impressions can be delivered in a week, month or other time period. Overestimating total inventory can disappoint advertising clients who expect and are willing to pay for delivery of a certain number of impressions during a given time period. Underestimating total inventory can result in lost sales opportunities.

Even more difficult is understanding how and where existing sold advertising will serve when the customer is not buying an individual unit but rather, is purchasing impressions which can be served by any combination of individual units. For example, an ad purchase is not necessarily for an ad to always show on the homepage whenever a website is first requested and viewed by a potential consumer. Rather, the purchase could be for delivery of an ad on a particular page of a web site when a consumer has requested a certain type of information (e.g., a particular type of car, some other specific type of product, etc.).

A potentially even more complex issue in predicting available online advertising inventory involves situations when a particular ad can be served to a number of different search requests. For example, using car advertising as a non-limiting example, an advertiser may wish to show a particular car ad when a user is viewing a web site or inputs a search request that specifies the make and/or model of that particular car. On the other hand, that same car ad may serve when a user inputs a different search that specifies a body style that same car belongs to (e.g., minivan, luxury vehicle, etc.). The same ad also might be served in response to a user's inquiry relating to the particular car's price range. Many other situations are possible.

These situations raise so-called "overlap" where ads targeted to different, sometimes specific entities can each be served in response to a given consumer request, but may also be served in response to completely different requests altogether. FIG. 1 is an attempt to graphically show such an overlap situation. The left-hand side of FIG. 1 shows a first set of possible user requests 50 in response to which ad 1 could be targeted and served. On the right-hand side of FIG. 1 is shown a second set of possible user requests 52 in response to which a second ad (ad 2) could be targeted and served. As can be seen in FIG. 1, there are some kinds of user requests in the first set 50 to which only the first ad (Ad 1) will be targeted and served, and there are some types of user requests in the second set 52 to which only the second ad (Ad 2) will be targeted and served. However, in the example shown, there is a subset 54 of the first set of user requests 50 that overlaps with the second set of user requests 52. This overlap region 54 indicates user requests for which either the first ad or the second ad could be targeted and served, Because of these overlap situations, an advertiser may tend to underestimate the number of impressions he can deliver in a targeted manner.

For a more concrete example, suppose a first ad is for a particular luxury sedan (e.g., Lexus LS) manufactured by Lexus, and a second ad is for a different Lexus model (e.g., Lexus GS). Suppose ad 1 targets any time the consumer inputs a search that implicates the manufacturer Lexus, and ad 2 targets any time a user inputs a search for cars that cost over $40,000. Now suppose a user requests Lexus models that cost over $40,000. In this particular example, either ad 1 or ad 2 can serve. The user's search request in this case falls within the overlap region 54.

Even though either ad 1 or ad 2 can be served in response to this particular user request, each ad may have individual goals so that the targeting engine that delivers the ads may prefer one ad over the other. Advertising targeting engines are very sophisticated and are able to make such decisions about which ads should serve based on a number of factors including priority. However, in the past it has been difficult to predict beforehand which ad or ads will serve in such overlap situations. This is especially true in view of the fact that although FIG. 1 shows the overlap between two different sets of user requests, in actual practice there may be multiple overlaps of three, four or more subsets where two, three, four or more ads could be served in response to a particular request falling within the overlap region 54. It has been difficult in the past to predict in advance with any degree of certainty what decision a real time ad targeting engine may make in real time ad targeting.

Because of these and other difficulties, it is not unusual for those who sell online advertising opportunities to underestimate the amount of advertising inventory that is available for particular ad targeting criteria. Overlap sometimes represents an opportunity to deliver additional ads (because any of multiple ads can deliver in response to requests in the overlap region), but conservative predictive approaches may consider all such requests to be reserved or taken up by one of the ads that can deliver and therefore underestimate available impression opportunities. It would therefore be desirable to interpret and simulate how ads will actually be served at a future time based on a variety of factors including for example seasonality, other "overlapping" ads in the system, priorities, impression goals and other factors. It would be desirable to use such interpretation and simulation to forecast capacity and remaining available inventory across any type of user request in order to accurately predict the number of impressions that are available for delivering targeted ads. Certain prior art approaches use data sampling as a way to managing the extremely large data volumes inherent to ad serving. Sampling is an efficient way to accomplish complex analysis in real time without the burden of attempting to process large amounts of data. In sampling, there is no attempt to analyze all available data or events. Rather, sampling relies on deriving what is assumed to be a statistically significantly subset of data/events that system designers hope will be representative of the comprehensive data set. Analysis is then carried on only on the samples—which involve much less data and can therefore be analyzed relatively efficiently in real time computation. Thus, some prior art approaches use statistical methods to estimate the probability of available ad impressions to sell. They sample against a large population of all impressions. However, sampling does not necessarily enable the subsequent ad availability calculation at a more granular targeting level. This is because random or other types of sampling of the aggregate population of historical impressions will in general inherently over sample, under-sample, or altogether "miss" samples within sub-populations of a higher granularity. Use of sampling makes the existing commercial solutions able to execute the algorithm against data in the server's memory relatively efficiently and does not require a large high performance database against which to execute the query or a large database for storage. These prior art approaches may be efficacious for publishers that do not target at a granular level, but they do not provide granular targeting. In contrast, aspects of the exemplary illustrative non-limiting technology herein can target at a more granular level accurately. The industry is moving closer and closer to granular targeting. The audience of one is the ultimate audience in any marketing effort. The exemplary illustrative non-limiting solutions herein advance the industry towards that end state.

The exemplary illustrative non-limiting technology herein provides systems and methods for determining the total capacity, amount reserved or sold and remaining availability for ad impressions for an online advertising publishing system. Calculations may be based for example on multiple factors including 1) actual historic data (avoiding the need to sample) of ad impression delivery, 2) various delivery parameters including ad targeting overlap with other ads, timing, priority and impression goals, and 3) a mathematical algorithm and calculations of the above incorporating adjustments due to seasonality and other market factors.

One exemplary illustrative non-limiting system implementation includes a database arrangement, a predictive engine, and a user interface.

In one exemplary illustrative non-limiting implementation, the database arrangement may provide a sophisticated data model tuned for performance leveraging actual past ad impression delivery, current and future orders for various capacity, combined with multiple forms of devised data which help identify where orders may overlap with one another. Additional storage may be provided for seasonal adjustments.

In an exemplary illustrative non-limiting implementation, the predictive engine may provide multiple sets of algorithms and data search strategies crossing the database and an application development language using a multi-step approach to determine the necessary capacity, booked and availability numbers.

An exemplary illustrative non-limiting user interface may provide a web-based or other application allowing entry of requests from users, and engaging the engine and database arrangement to perform desired calculations to provide output back to users.

Search techniques can provide accurate forecasting by calculating, in a predictive manner, which impressions to be delivered in the future have been taken up by ads already sold, thereby providing an accurate indication of how many impressions are left to be sold. Part of such predictive analysis provides a more accurate prediction of how many impressions are likely to be delivered based on factors such as seasonality, historical precedents as extrapolated for current traffic levels, and other factors. After forecasting how many impressions are likely to occur within a given time in the future, it is possible to subtract the impressions that have already been sold to other advertising clients. These forecastings and subtraction calculations may be performed on a highly granular level in response to particular user input criteria, response sets to be targeted or other user events or interactions. This allows advertising sales personnel to help an advertising client define a distinctive set or subset of user inputs or other events to which an ad is to be served, thereby maximizing targeting effectiveness as well as maximizing the utilization of overall number of available impressions to serve targeted ads.

Ad overlap detection is facilitated in the exemplary illustrative non-limiting implementation by configuring the real time ad targeting and delivery system to log not only impressions actually delivered, but also impressions that could have been delivered with appropriate targeting criteria (e.g., not just the impression that "won out" in the targeting process, but also the "runners up.") The "runners up" information is used as part of "actuals" data to more accurately assess ad overlap situation.

In one exemplary illustrative non-limiting implementation, overlap situations as shown in FIG. 1 may be assessed using a multi-variable calculation including various factors or combinations of factors. In a car advertising example, such variables could include for example car make, car model, overall market demographics, car body style, age of car, type of user search, and other factors. An overall goal is to not oversell or undersell inventory that has already been sold to other advertising clients, and to optimize the targeting of remaining inventory left to sell. Such calculations enable yield management to provide pricing based on scarcity and other factors, and also provide advertising personnel with a good understanding about what inventory is left to sell. Such understanding can be provided at a very fine level of granularity commensurate with highly precise targeting of ads. Predictive calculations can be used to analyze historical distribution of ads and perform algorithms that take into account changing conditions in the future.

In more detail, an exemplary illustrative non-limiting implementation assesses overall capacity of a particular web site to deliver ads (impressions) by analyzing historical data of ads requested and served. In one exemplary illustrative non-limiting implementation, such capacity is assessed based on monthly data (e.g., 28 days, based on each day of the week for four weeks). Such historical data may be available for example from an ad serving web log that makes a record every time an ad is served. The capacity takes into account specific user queries.

The exemplary illustrative non-limiting implementation does not necessarily however simply determine the total number of impressions that may be delivered. In addition, based on such historical analysis, the exemplary illustrative non-limiting implementation can assess, using a multi-variable analysis, more detailed capacity to serve ads in response to certain user queries or types of queries or other information. This fine granularity of capacity assessment can then be used to determine how many of the forecasted number of impressions predicted to be available in the future have already been sold to existing advertising clients.

The remaining capacity assessment in the exemplary illustrative non-limiting implementation uses a predictive analysis to determine which existing ads and their targeting criteria that have already been sold have used up which impressions. The predictive analysis can take into account the overall factors described above for situations where multiple ads might be served in response to a particular user request when factors such as priority are used dynamically in real time by the ad targeting engine to finally determine which ad would likely be served in response to a particular user request. Remaining capacity calculation in the exemplary illustrative non-limiting implementation takes priority into account as well as assessing what other types of user requests a particular ad might be served to.

The exemplary illustrative non-limiting implementation may also take seasonality into account in order to accurately forecast and optimize the number of impressions that are predicted will be served. Seasonality means more than total traffic since user queries may tend to be cyclical (e.g., higher interest in convertibles in the springtime, 4WD vehicles in the winter, etc.)

In accordance with one exemplary illustrative non-limiting implementation, the forecasting algorithms do not rely on predetermined brackets or categories but rather use simulations to provide results based upon real queries that are provided by the advertising client and/or the advertising salesperson. This allows an advertising sales team working with an advertising client to optimize utilization of remaining inventory as well as improve the forecasting of which ads will be delivered in a targeted manner.

An exemplary illustrative non-limiting implementation uses one or more projection factors from historical information and provides additional weight based on seasonality. It is thus possible to very accurately book ads to a fine level of granularity without having to rely on sampling (which may often be inaccurate).

Further exemplary illustrative non-limiting features and advantages include:
  forecasting based on actual data, not just sampling
  agnostic as to which engine is used to serve ads
  same forecasting calculations can be generalized or used irrespective of particular ad delivery and/or targeting platform
  overlap calculation with forecasting based on actuals
  review current state of orders booked in the system including orders that have not started serving
  in one exemplary non-limiting implementation, no requirement to rely on statistical factors because the exemplary illustrative non-limiting algorithms are capable of figuring out exactly how many impressions are available (i.e., both scarce and targeted)
  outputs include indication of current orders already booked in the system, reports, and guidance as to how to maximize such optimized advertising inventory for specifically targeted ads
  possibility to maximize revenue by allowing sales force to sell aggressively and with confidence
  user interface provides visible information about what inventory is left to sell

BRIEF DESCRIPTION OF THE DRAWINGS

These and other features and advantages will be better and more completely understood by referring to the following detailed description of exemplary non-limiting illustrative implementations in conjunction with the drawings of which:

FIG. 2A shows an exemplary illustrative non-limiting query builder user interface display;

FIG. 2B shows an exemplary illustrative non-limiting results user interface display;

FIG. 2C shows an exemplary illustrative non-limiting retrieve query user interface display;

FIG. 2D shows an exemplary illustrative non-limiting report user interface display;

FIG. 2E shows an exemplary illustrative non-limiting seasonality user interface display;

DETAILED DESCRIPTION

Figure 1:
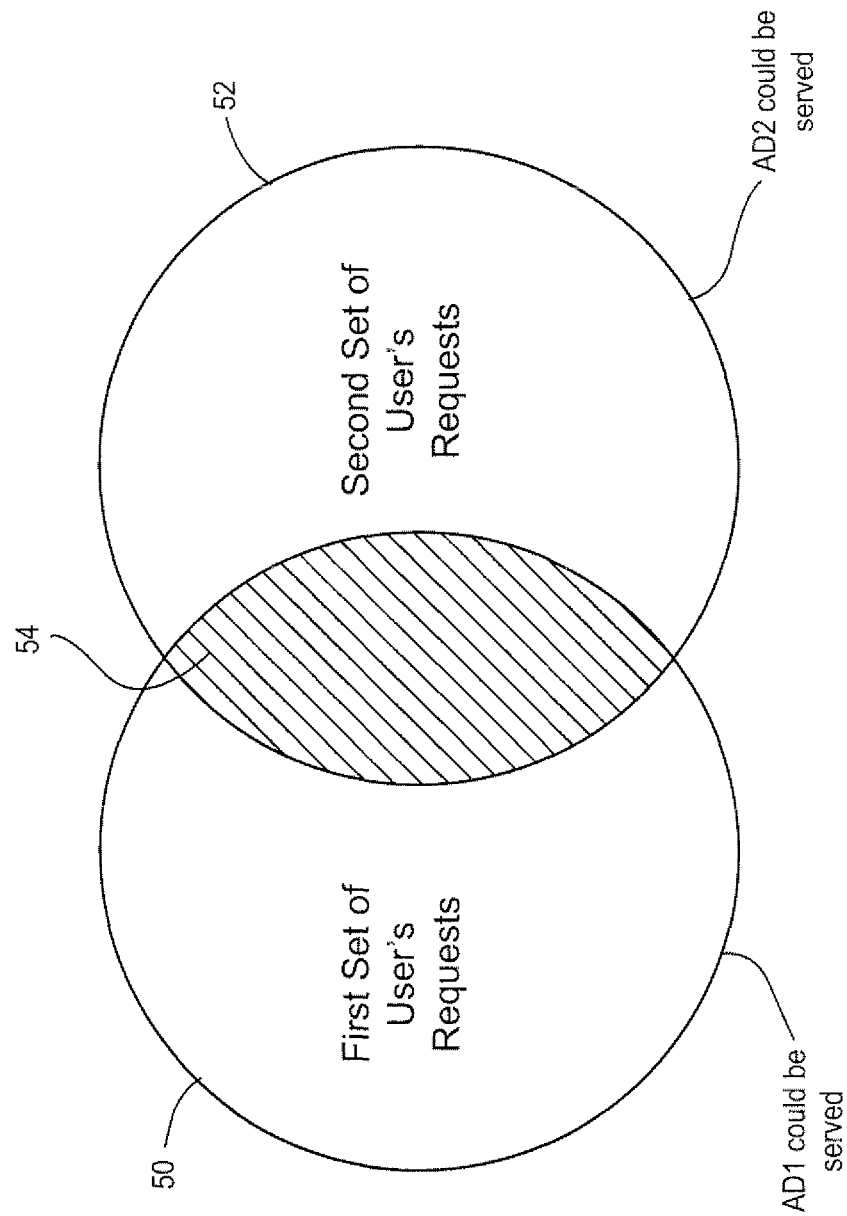
FIG. 1 shows exemplary illustrative non-limiting overlapping ads.
Figure 2:
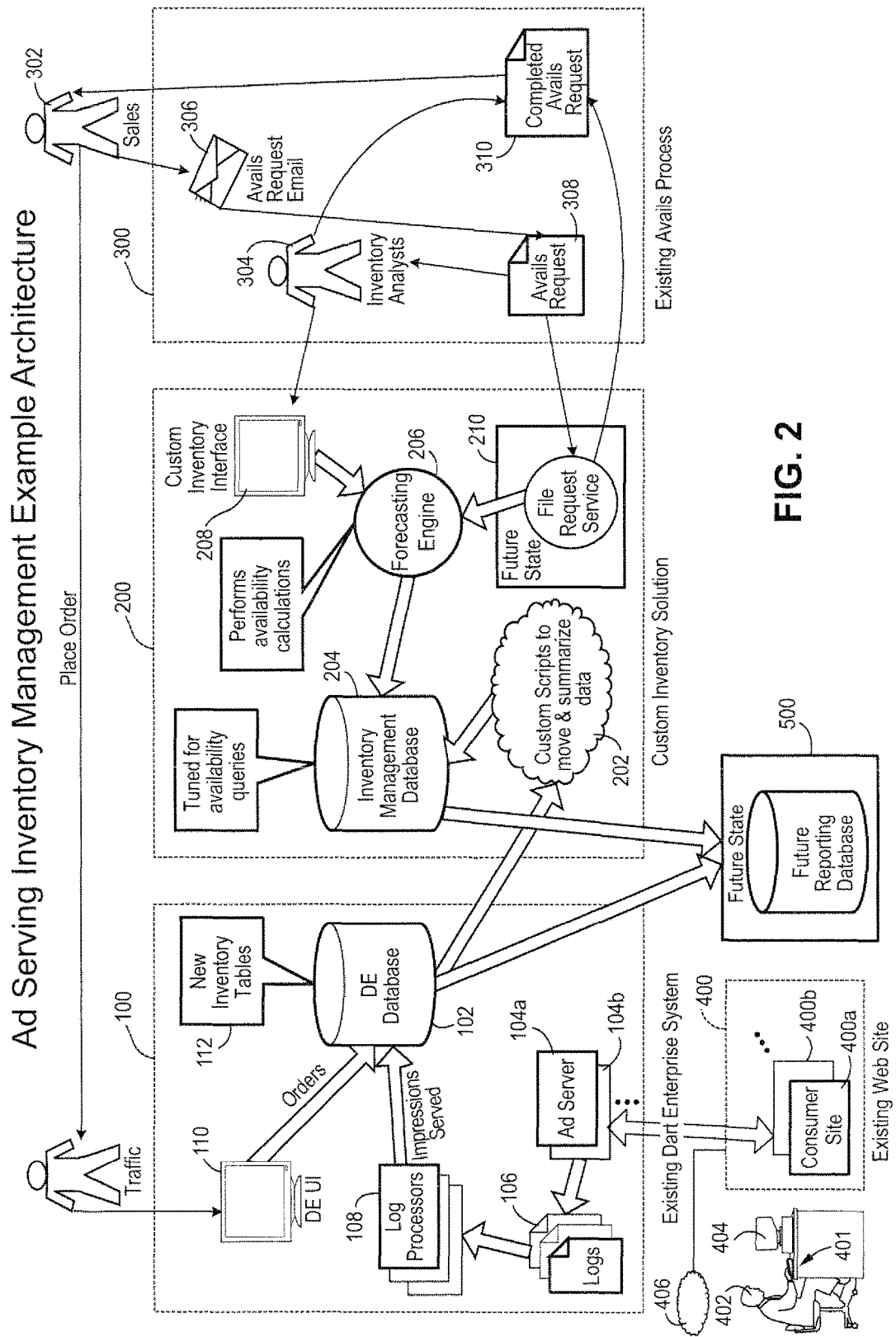
FIG. 2 shows an exemplary illustrative non-limiting ad serving inventory management architecture.

FIG. 2 shows an exemplary illustrative non-limiting comprehensive online advertising serving and inventory management architecture. The FIG. 2 example shows three main functional blocks:

Real time ad serving system 100,

Inventory management system 200 including database 204, database forecasting engine 206 and inventory user interface 208, and Sales subsystem 300.

In more detail, real time ad serving system 100 as shown in FIG. 2 is mostly conventional. It includes a database 102 that keeps track of the impressions that are served by one or more real time ad servers 104. In the example shown, one or more consumer web sites 400 deliver web pages including advertising to consumers 402 viewing the web pages on personal computers or other web browsing clients 404. Ad server(s) 104 target and deliver ads to such consumers via the Internet or other communications means 406 either directly or through consumer site 400 or server farms. Ads that the ad server(s) 104 deliver are logged by an ad server logger 106. The logs 106 are processed by one or more processors 108. The resulting processed log data are stored as impressions served within database 102. In a conventional fashion, an advertising salesperson 202 can place orders that are input into a live ad serving database 102 via a user interface 110. Inventory tables 112 maintained within database 102 may be used to facilitate the predictive aspects of solution disclosed herein.

Data stored by the "ads served" database 102 may be periodically copied to inventory management system 200 by a process including custom scripts or other programs. In the exemplary illustrative non-limiting implementation, the "ads served" database 102 stores "actuals" (namely full data set—an actual recording of all impressions and thus all samples stored at and calculated on at the individual event level. Use of the "ads served" database 102 (or a copy of same) allows system 100 to both store the data and calculate on it at the actual impression level. The exemplary illustrative non-limiting implementation also captures actual detailed impression counts for every combination of targeting to which an ad has been served and then calculates impressions which we could have been served. This "could have been served" targeting is continually performed by the ad servers 104 for each impression served and is stored in a table that is available to the ad inventory management process. The exemplary illustrative non-limiting system uses such data to speed up query response time and provide a more accurate result of what is available to purchase. Thus, copying processes move and summarize the data 202 from database 102 for storage in an inventory management database 204. The inventory management database 204 may use these "actuals" to provide a sophisticated data model for performance leveraging actual past ad impression delivery, current and future orders for various capacity, combined with multiple forms of devised data which help identify where orders may overlap with one other. Additional storage may be provided for seasonal adjustments.

A forecasting engine 206 uses the inventory management database 204 to perform availability calculations. Forecasting engine 206 in the exemplary illustrative non-limiting implementation may be equipped with multiple sets of algorithms and data search strategies that analyze database 204 contents in the application development language using a multi-step approach to determine necessary capacity, booked and availability numbers. A custom inventory user interface 208 may be accessed by inventory analysts 304 to dynamically initiate and perform such forecasting and to display analysis results that may be used to change the state of available ad inventory and targeting. Such inventory analysts 304 may receive inquiries from sales force 203 via emails 306. A queue of availability requests 308 may be analyzed by the inventory analysts 304 through use of the custom inventory interface 208 that is coupled to forecasting engine 206 which in turn accesses inventory management database 204.

In one exemplary illustrative non-limiting implementation, the custom inventory interface 208 may comprise a web based application allowing entry of requests from users, gauging the forecasting engine 206 and the inventory management database 204 to perform the necessary calculations to provide output back to the inventory analysts 304. In addition, an automatic file request service process 210 is used to service availability requests 308 and provide responsive completed availability requests 310 which may in turn be used to inform the sales force 302.

A reporting database 500 may be responsive to both the live impressions served database 102 and the inventory management database 204 to provide advanced reporting functions on demand.

FIGS. 2A-2E show exemplary illustrative non-limiting user interface displays provided by user interface 208. The exemplary illustrative user interface provides main functionality for an ad inventory tool, a query builder, a retrieve query function, a query reporting function, and a seasonality function. Users (sales force) can interact with the user interface 208 as described below:

(1) Sales Team 302 works to put together an ad pitch for a potential customer.

2) Team 302 submits an "avails request form" which lists on it the various ad placements the sales team wants to sell.

Figure 2A:
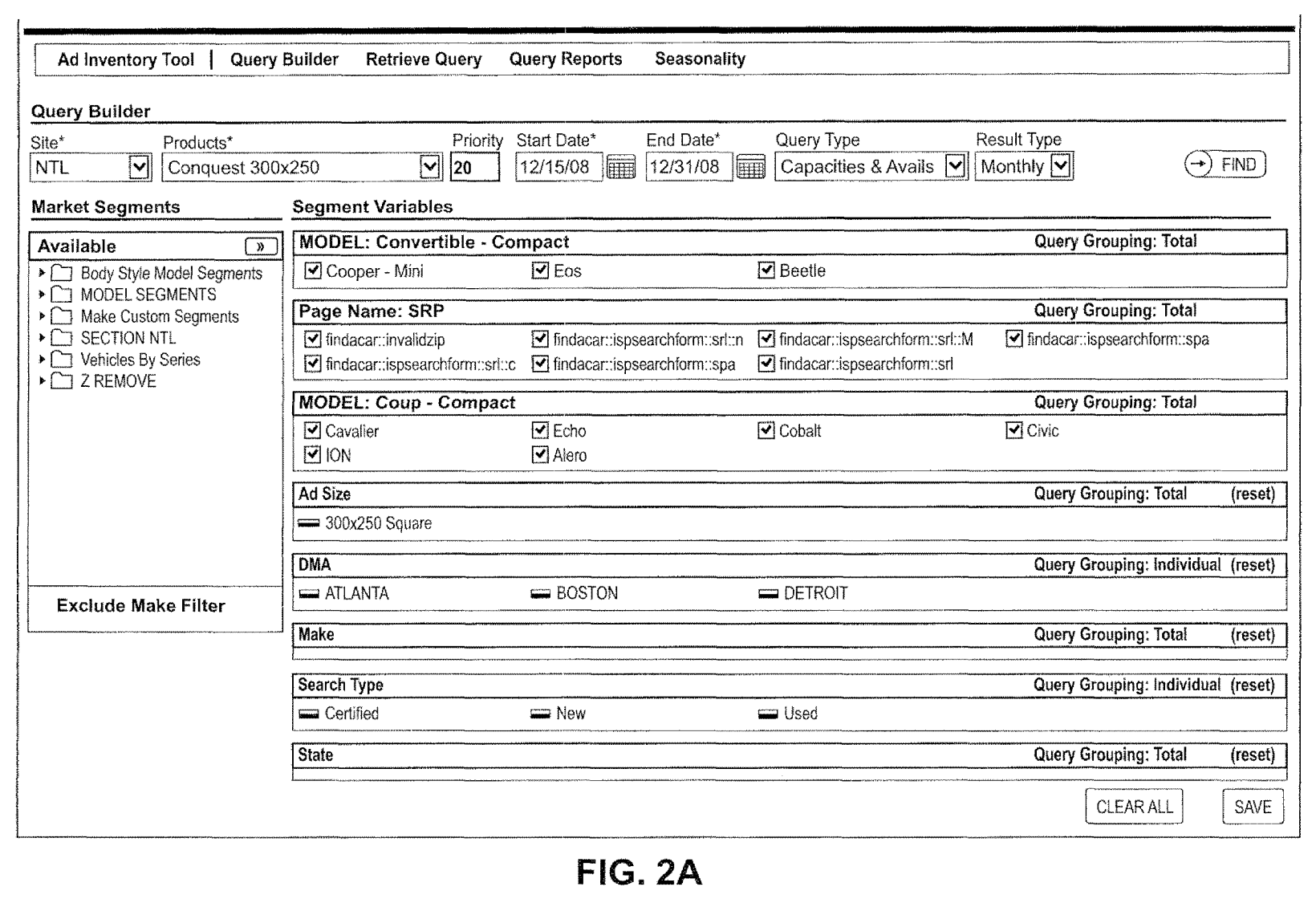

3) Inventory Analyst 304 uses the Ad Inventory Tool to input the requests into the application on the Query Builder Screen an example of which is shown in FIG. 2A. Input can be based on checking boxes, inputting strings, pulls-down menus or any other convenient means. In the example shown, this request is for a particular ad format (300×500) on a particular website (NTL) for a specified time period (two weeks between December 15-December 31) and a particular priority level (20) for compact convertibles and compact coupes in certain geographical markets (e.g., Boston, Atlanta and Detroit) for particular types of user inquiries (e.g., New, Used and Certified Search Types) inputted into a certain web page (SRP) on the website to deliver the ads.

4) Inventory management system 200 performs an analysis and returns results (see for example the exemplary illustrative non-limiting FIG. 2B Results user interface display). The user can get the actual ad "in flights" (i.e., ads that are already scheduled to be delivered) that are taking up specific capacity by clicking on the availability number which may pop up the flight data window shown on the same screen. These data may be exported to a spreadsheet such as Excel and sent back to the brand team to price and put in the pitch.

5) User can save or retrieve the query (see for example the exemplary illustrative non-limiting FIG. 2C retrieve query screen shot) to be run again at a later time to recheck the available inventory right before purchase or to rerun at later months (many customers buy the same inventory month after month).

6) Some queries can be rolled up and run each night to give a full view of availability in a true report style (see for example the exemplary illustrative non-limiting FIG. 2D report screen shot).

7) Algorithms that the tool uses are adjusted for seasonality, economic and industry factors and site growth (see for example the FIG. 2E exemplary illustrative non-limiting Seasonality screen shot).

Example Implementation Architecture

Figure 3:
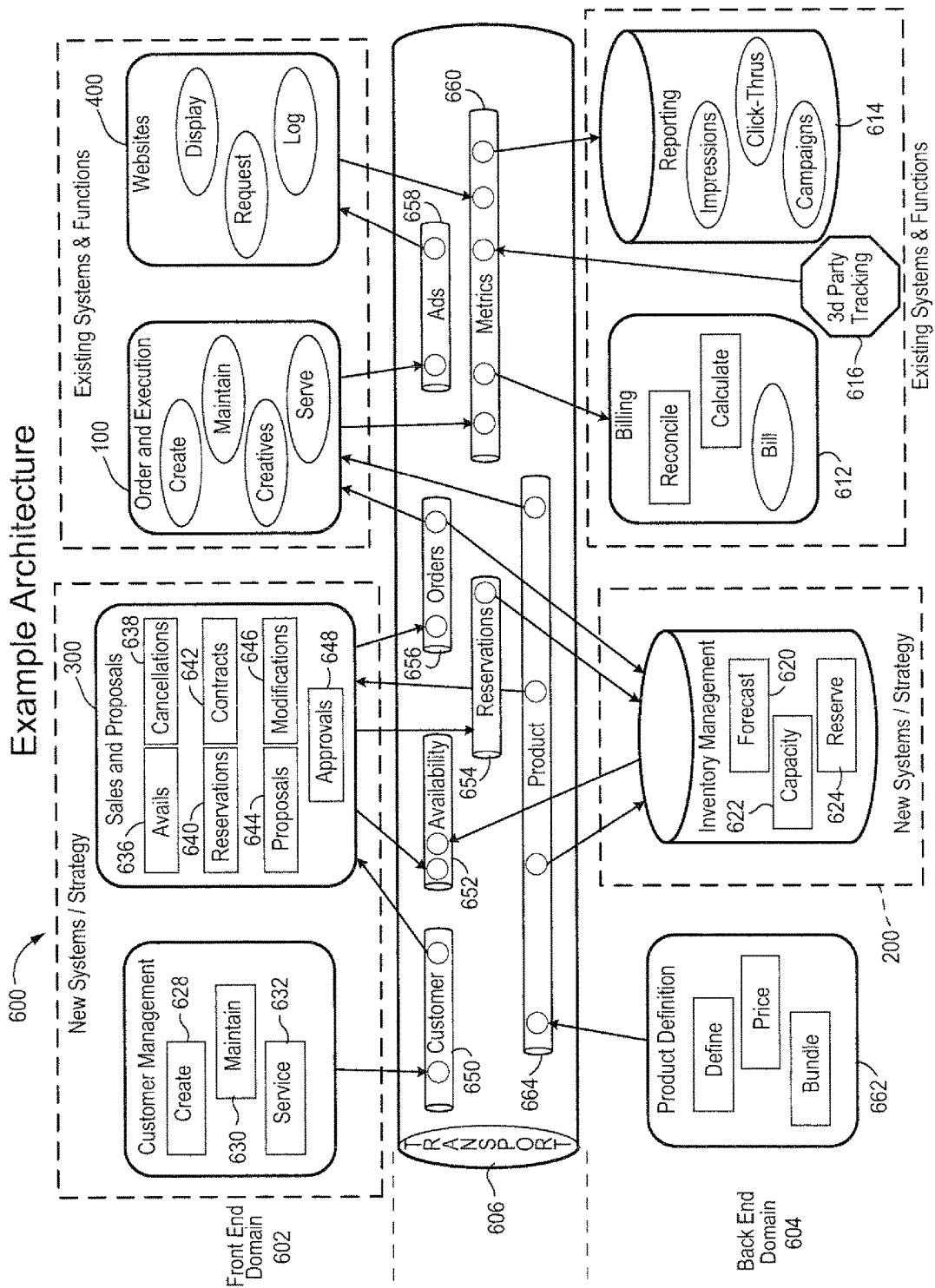
FIG. 3 shows a more detailed exemplary illustrative non-limiting more detailed ad serving inventory management architecture.

FIG. 3 shows an exemplary illustrative non-limiting overall ad inventory management and delivery system architecture 600 that encompasses the functionality of FIG. 2 and subdivides it into a front end domain 602 and a back end domain 604. A transport 606 is used to provided information between the front end domain 602 and the back end domain 604. Conventional order and execution 608 and web sites 610 may be used in conjunction with conventional back end billing 612 and reporting 614 as well as third party tracking 616 functions. A new inventory management system and strategy 618 provides forecasting 620, capacity assessment 622 and reserve assessment 624. Such new inventory management functionality 618 may work in conjunction with new front end customer management 626 providing create 628, maintain 630 and service 632 functionality. In addition, sales and proposals 634 functions including availability assessment 636, cancellation 638, reservations 640, contracts 642, proposals 644, modifications 646, and approval 648 may be supported. The transport 606 between front end domain 602 and back end domain 604 provides customer communication 650 between customer management 626, sales and proposals functionality 634. Availability information is communicated via transport block 652 between the sales and proposals functionality 634 and the inventory management 618. Similarly, reservations may be communicated via transport layer 654 between sales and proposals 634 and inventory management 618. An orders transport layer 656 may communicate order information between sales and proposals 634, order and execution function 608 and inventory management 618. The ads themselves may be served by the order and execution block 608 to web sites 610 via a transport ads layer 658. Metrics are handled in a conventional fashion for data exchange between order and execution block 608, web sites 610, billing 612, third party tracking 616, and reporting 614 communicated via a metrics transport layer 660. Product definition may be provided by a product definition block 662 and communicated via a product transport layer 664 to inventory management 618 as well as to the order and execution block 608.

Example Logical Architecture

Figure 4:
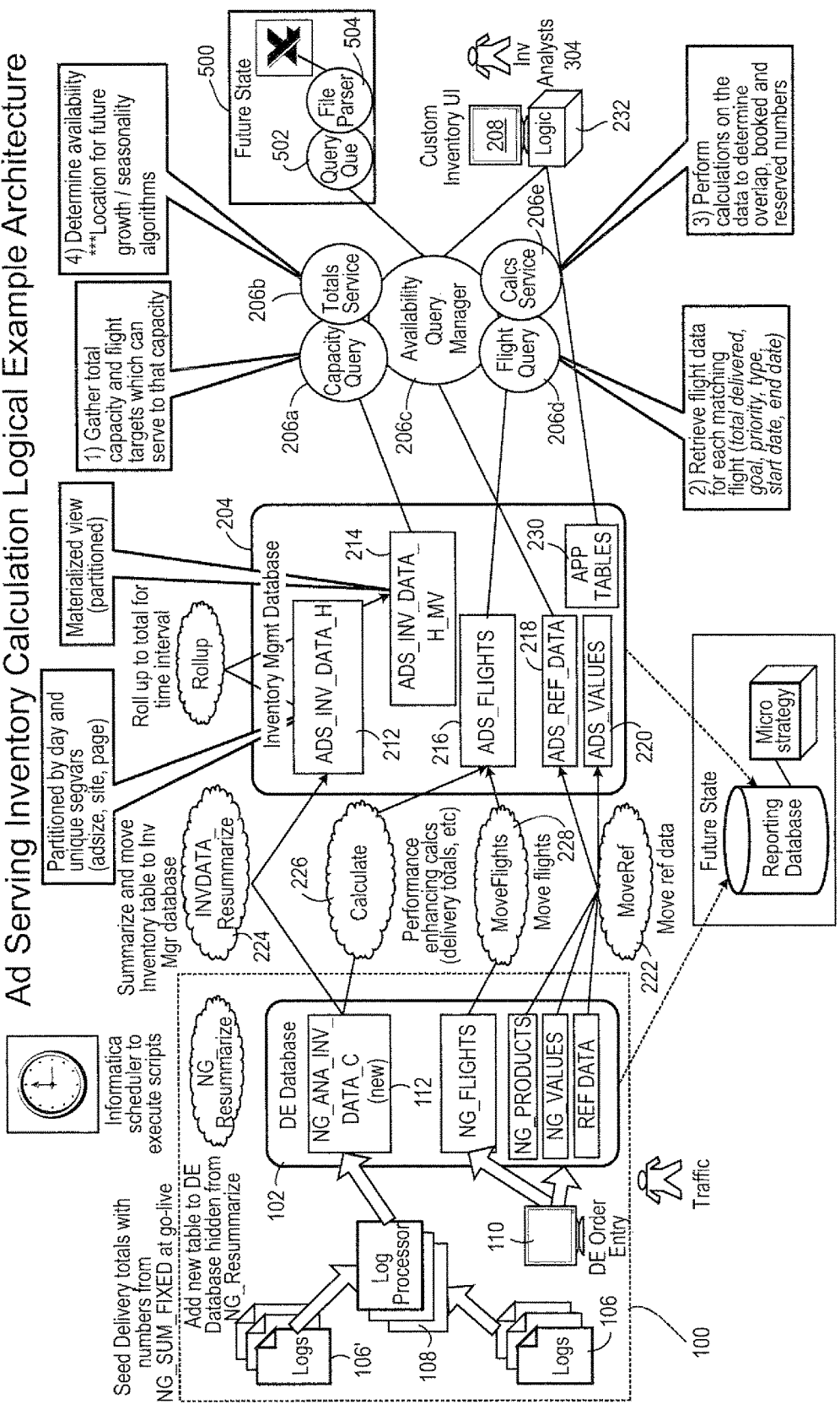
FIG. 4 shows an exemplary illustrative non-limiting ad serving inventory calculation logical architecture.

FIG. 4 shows an exemplary illustrative non-limiting ad serving inventory calculation logical example architecture that refers back to FIG. 2. In this example, the database and execution block 100 of FIG. 2 is shown in more detail as providing, within database 102, a conventional "NG_FLIGHTS", NG_PRODUCTS", "NG_VALUES" and reference data. A set of inventory tables that is not susceptible to being summarized by conventional processes is also provided.

FIG. 4 further shows the inventory management database 204 as providing a number of data tables including an inventory data table 212, a further inventory "MV" data table 214, a "FLIGHTS" data table 216, a reference data table 218 and a values data table 220. A "MoveRef" function is used to organize and process data from the "PRODUCTS", "VALUES", and "REF_DATA" tables within database 112 and stored as data into the REF_DATA 218 and VALUES table 220 of inventory management database 204. Similarly, an inventory data resummarize function 224 is used to resummarize the inventory data table 112 and create and/or update the inventory data table 212 stored within inventory management database 204. This inventory data table 212 may be partitioned by day and other unique segment variables (e.g., ad size, site, page, etc.). The resulting inventory data table 212 may be broken down into a materialized partition view and stored in the "MV" data table 214. Meanwhile, the calculate function 226 provides performance enhancing functions. A state reporting database 500 includes a query 502 and a file parser 504 which work in cooperation with availability query manager 206c to provide reporting functions.

In the exemplary illustrative non-limiting implementation, the move flights function 228 and/or the move reference data function 222 may move information in real time through the transport layers 606 shown in FIG. 3. In addition, in the exemplary illustrative non-limiting implementation, the calculate function 226 and a move flights function 228 write to the same "FLIGHTS" table 216 to provide coordination. Partitioning of the inventory management database 204 preferably should aid performance by optimizing table size.

Figure 6:
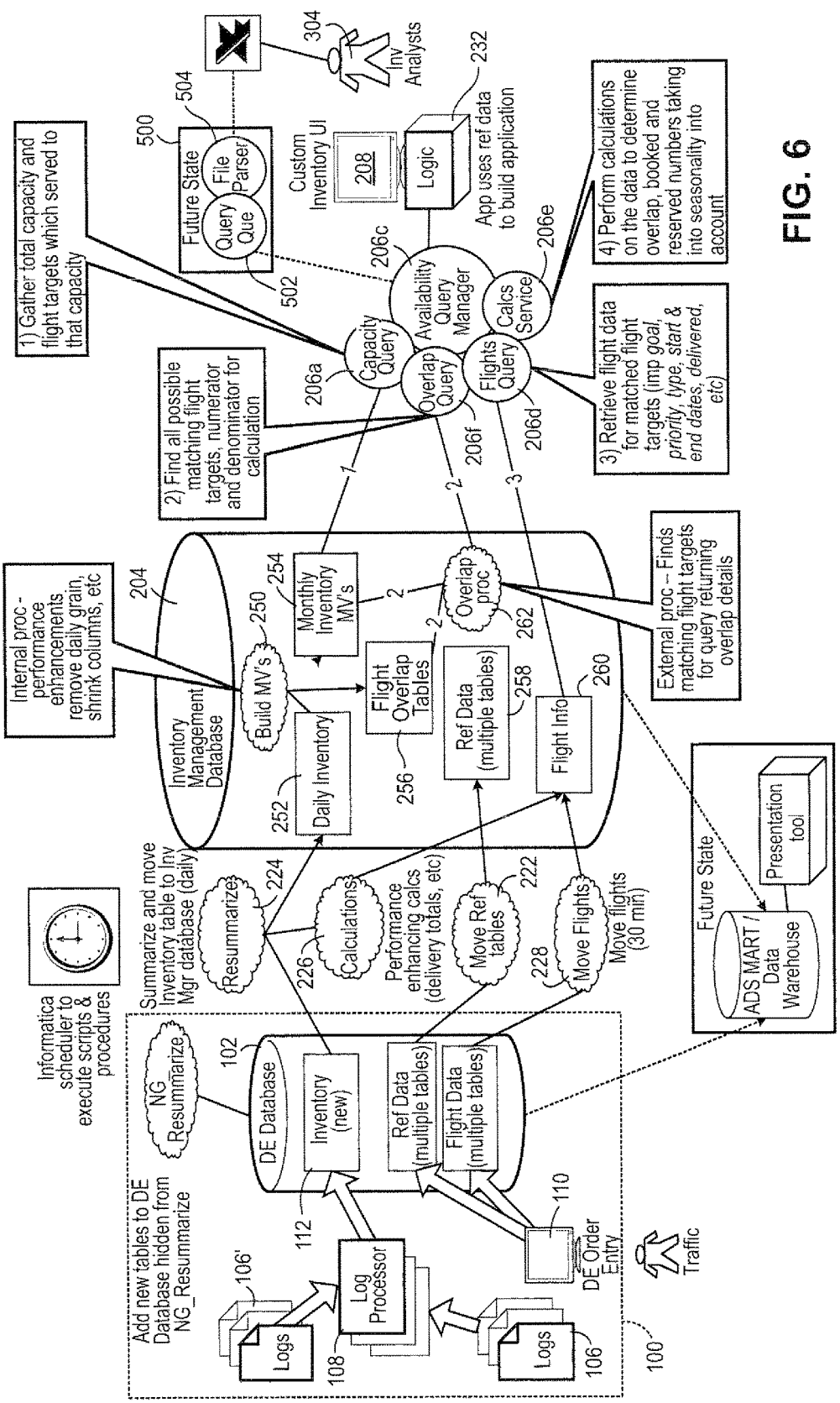
FIG. 6 shows an exemplary illustrative non-limiting ad serving inventory management logical architecture.

Forecasting engine 206 as shown in FIG. 6 is implemented by a cluster of functions including a capacity query function 206a, a totals service 206b, an availability query manager 206c, an in flight query 206d, and a calculations service 206e. These functions are detailed in more detail in later figures.

Some of the functions shown as being performed in connection with inventory management database 204 may, in certain implementations, desirably be performed on the database 102 instead. For example, the summarize function 224 could be performed within block 100 on database 102 and the data table 212 may be stored within database 102 and then copied to database 204 as desired. In the exemplary illustrative non-limiting implementation, the reporting database could be created within block 500 for historical reporting. More detailed implementation can be provided using conventional tools such as Java, Informatica, conventional database access technology and systems rules.

Example Logical Inventory Availability Base Algorithm

Figure 5:
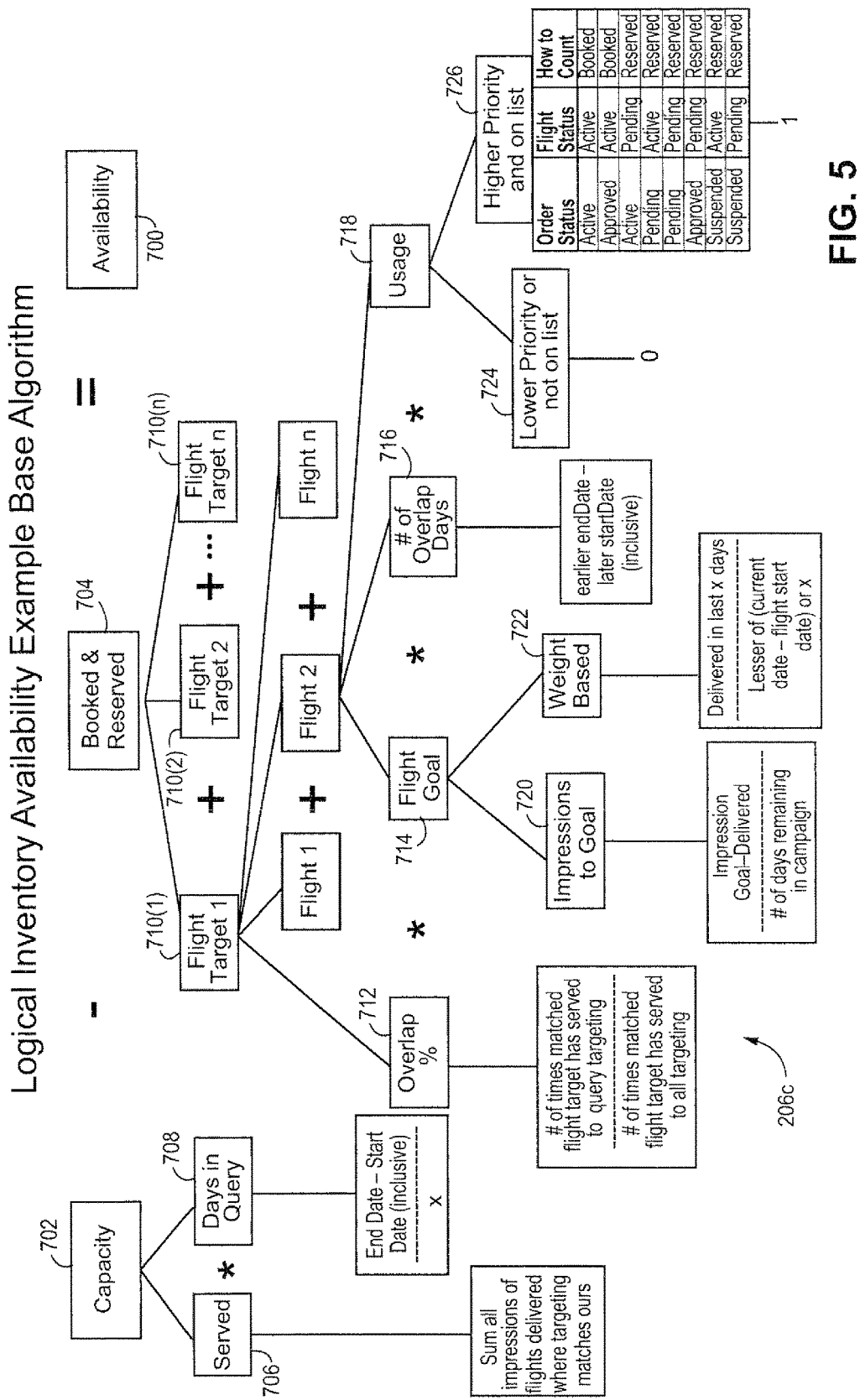
FIG. 5 shows an exemplary illustrative non-limiting logical inventory availability based algorithm.

FIG. 5 shows an exemplary illustrative non-limiting logical inventory availability base algorithm performed by forecasting engine 206. In the example shown, availability 700 is determined by a straightforward equation:

$$\text{Availability} = \text{Capacity (702)} - \text{Ads Booked and Reserved (704)}.$$

In the exemplary illustrative non-limiting implementation, capacity, in turn, is determined by ads served 706 (i.e., the sum of all impressions of flights delivered where targeting matches the current query) multiplied by the number of days in the query 708. The number of days in the inquiry can be calculated as the end date minus the start date inclusive divided by x.

In this exemplary illustrative non-limiting implementation, the number of ads booked and reserved is calculated as being equal to a flight target 1 710(1)+the flight target 2 710(2)+flight target n 710(n). In other words, the number of ads booked and reserved can be determined as the total number of ads "in flight" that are targeted based on the various combinations of queries. The percentage of overlap 712 is calculated based on the number of times the matched flight target has served to the query targeting in historical database divided by the number of times the matched flight target has served to all targeting. Such percentage of overlap 712 calculation can be assisted by actual data logged by the real time ad targeter 104 indicating which impressions could have been served within the targeting rules, i.e., "runners up."

The exemplary illustrative non-limiting implementation takes this overlap percentage 712 into account in determining the number of ads that have been booked and reserved 704. Meanwhile, each flight target is calculated as the overlap 712 times the flight goal 714 times the number of overlap days 716 times usage 718. Flight goal 714, in turn, is calculated based on impressions to goal 720 (i.e., impression goal—delivered divided by number of days remaining in the ad campaign) as weighted by a weight based factor 722 (i.e., how many ads were delivered in the last x days divided by the lesser of the (current date minus flight start date) or x. The number of overlap days 716 is calculated as the earlier of the end date minus the later start date inclusive. Usage may be calculated based on priority (e.g., a lower priority or not on the priority list 724, or ads that are higher priority and are on the priority list 726). Working assumptions may include the following in this particular exemplary illustrative non-limiting implementation:

projections are flat so there is no need to account for variances such as season, promotions, etc.
capacity and overlap are based on the last 28 (x in the algorithm described) days, rolling
weight based campaigns are always assumed to be 100%
if a weight based campaign exists at the same priority, it will show all as booked for availability purposes
impression weight based campaigns cannot be on the same priority in this particular exemplary illustrative non-limiting implementation The algorithm shown in FIG. 5 thus provides an accurate dynamic determination of availability based on accurately forecasted capacity minus number of ads booked and reserved, but includes some limitations. In some exemplary illustrative non-limiting implementations, it may take some time (e.g., 28 days) worth of new targeting running to get accurate capacity and availability numbers. The value of x may be reduced to decrease this lag time with reduced accuracy. It is possible that availability may be overstated at the higher priority flight end and other flights exist with overlapping targeting with a higher priority than the query priority. Also, there may be times during which the algorithm may not determine accurate availability when multiple flights with the overlapping targeting exist and impression goals exceed their capacity (e.g., overbooking). Furthermore, flights that may have not yet served to a target may not be accounted for if they have a unique flight target.

FIG. 6 shows a further exemplary illustrative non-limiting ad serving inventory management logical architecture providing some additional functionality as compared with FIG. 4. In the FIG. 6 example shown, the resummarize function 224 may summarize and move inventory table to the inventory management database 204 periodically such as daily, whereas the move flights function 228 may move flights at a much more frequent occurrence (e.g., every 30 minutes). A "build MV's" function 250 may be used to provide internal performance enhancements to remove daily grain, shrink columns and the like. The resulting daily inventory 252 as well as monthly inventory 254 could be used to construct flight overlap tables 256. Reference data in multiple tables 258 may also be maintained along with flight information 260. An external overlap process 262 may be used to find matching flight targets for a given query and return overlap details to an overlap query 206f that finds all possible matching flight targets, providing numerator and denominator calculation. The implementation shown in FIG. 6 allows for a reduction in log size to allow new tables with increased size, and may potentially use some stored procedures to wrap some of the user interface calls to the database for performance ratings. It may be desirable to provide a query result set from a capacity query and overlap queries for performance within blocks 206f, 262.

Figure 7:
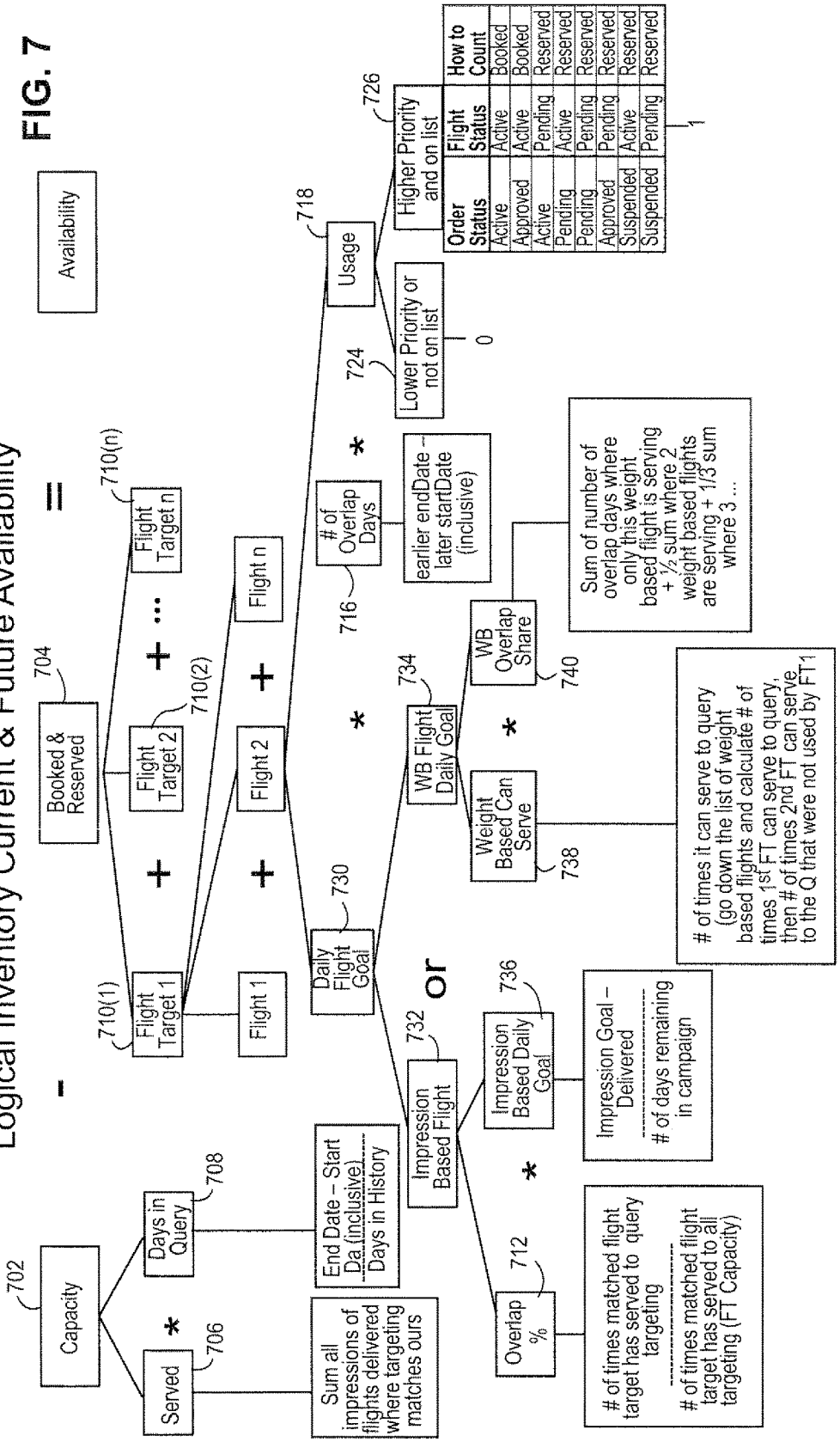
FIG. 7 shows an exemplary illustrative non-limiting algorithm for forecasting logical inventory current and future availability.

FIG. 7 shows an exemplary illustrative non-limiting further implementation of a logical inventory providing current and future availability in conjunction with the FIG. 6 architecture. For every day that weight based flights of the same flight target/priority overlap with the query window, the implementation shown provides the flight's quantity of the number of shared flights (e.g., for example, if there are three weight based flights with the same priority/flight target, divide by three for each day; if there are five, divide by five). As can be seen, the flight goal 714 in FIG. 5 has been enhanced to provide a daily flight goal 730 in FIG. 7 which is calculated based on an impression based flight 732 or a weight based daily goal 734. Impression based flight 732 may be determined based upon overlap percentage 712 multiplied by an impression based daily goal 736 (e.g., impression goal minus delivered/number of days remaining in campaign). The weight based flight daily goal 734 may be calculated based for example on the weight based "can serve" (i.e., the number of times an ad can serve to a query) multiplied by the weight based overlap share 740 (e.g., the sum of the number of overlap days where only this weight based flight is serving plus some percentage such as ½ the sum where two weight based flights are serving, ⅓ sum where three are serving, etc. A challenge is how to estimate the flight goal of weight based campaigns when other weight based campaigns of the same priority exist for some/all of the overlap days. The implementation shown in FIG. 7 may not take into account if there are weight based campaigns of the same flight targeted different priorities, but it will take x days of new capacity to run to get accurate numbers. Manual multiplication can be done to overcome the shortfall if necessary.

Figure 8:
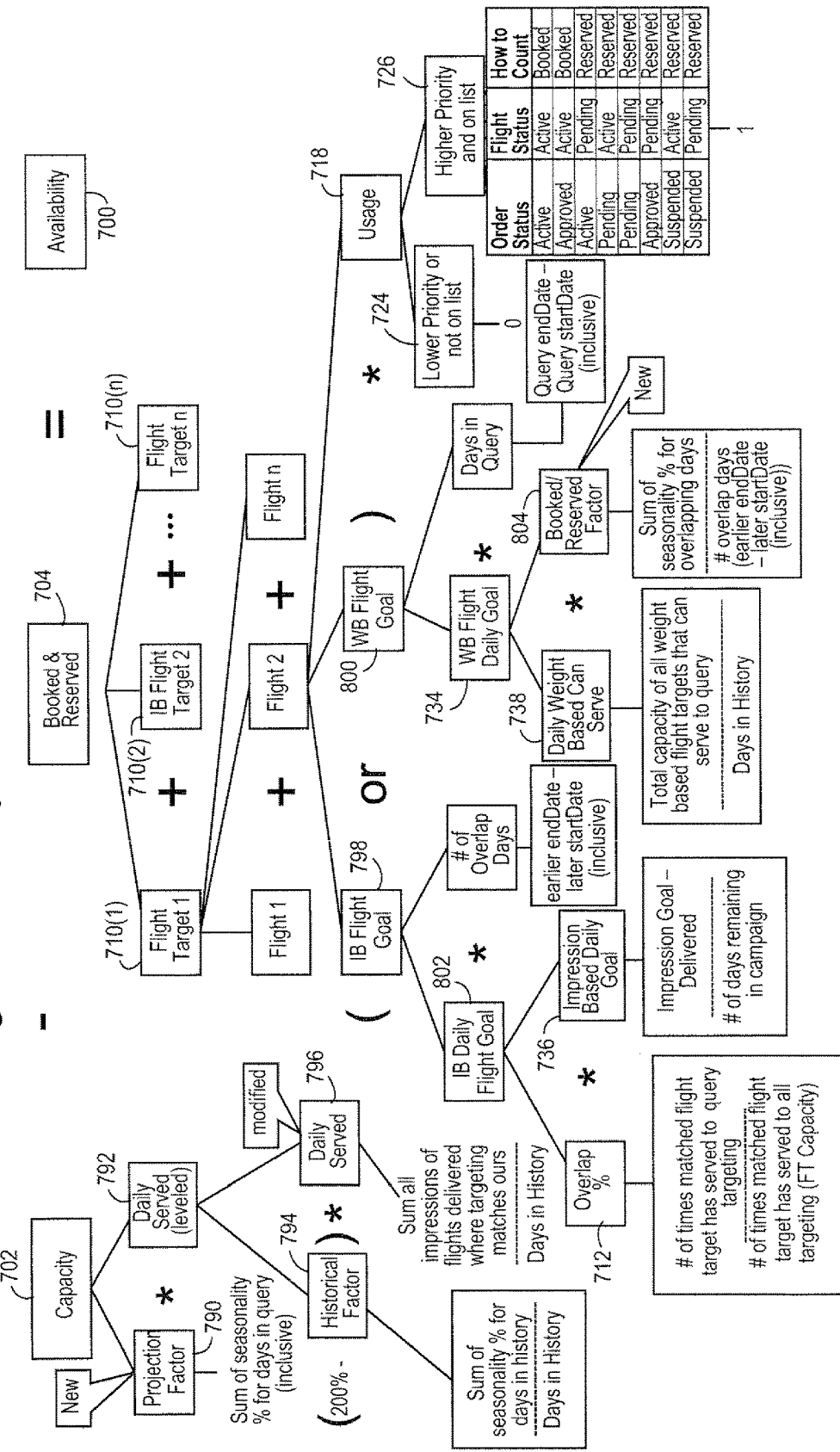
FIG. 8 shows an exemplary illustrative non-limiting logical inventory availability algorithm that takes seasonality into account.

FIG. 8 shows further non-limiting exemplary illustrative example of a logical inventory calculation providing forecasting of current and future availability including seasonal forecasting. In the exemplary illustrative non-limiting implementation, capacity 702 is determined in part based on a projection factor 790 which accounts for the sum of seasonality percentage for days in the query (inclusive). This projection factor is used to multiply a daily served (level) number of impressions 792 that may be calculated based on an historical factor 794 based for example on the sum of seasonality percentage for days in history divided by the number of days in history. This historical factor may be subtracted from 200% for example and then multiplied by the number of daily served ads 796 which may be calculated as the sum of all impressions of flights delivered where targeting matches the current query divided by the number of days in the history. Meanwhile, the "booked and reserved" determination 704 may be provided for a given flight by using an "IB flight goal" 798 or a weighted "WB flight goal" 800 in the alternative. The "IB flight goal" 798 may be determined for example by assessing an IB daily flight goal 802 based on the percentage overlap 712 for the impression based daily goal 736 as described previously. The weighted flight goal 800 may begin the assessed using the weighted daily flight goal 734 based on the daily weight based "can serve" multiplied by a seasonal booked/reserved factor 804. This booked/reserved factor 804 may account for example for the sum of seasonality percent for overlapping days divided by the number of overlap days (earlier end date minus later start date inclusive). Seasonality in the FIG. 8 exemplary illustrative non-limiting implementation thus adjusts both the capacity and the booked/reserved quantity for weight based flights. It is possible to average out the seasonality across all of the days that the user is querying for, and apply this to the forecast as a lump sum. One characteristic of the exemplary illustrative non-limiting implementation shown in FIG. 8 is that if there is a weight based campaign that can serve at any time during the query window, it will. Furthermore, it will continue to take x days of new capacity to run to get accurate numbers.

Figure 9:
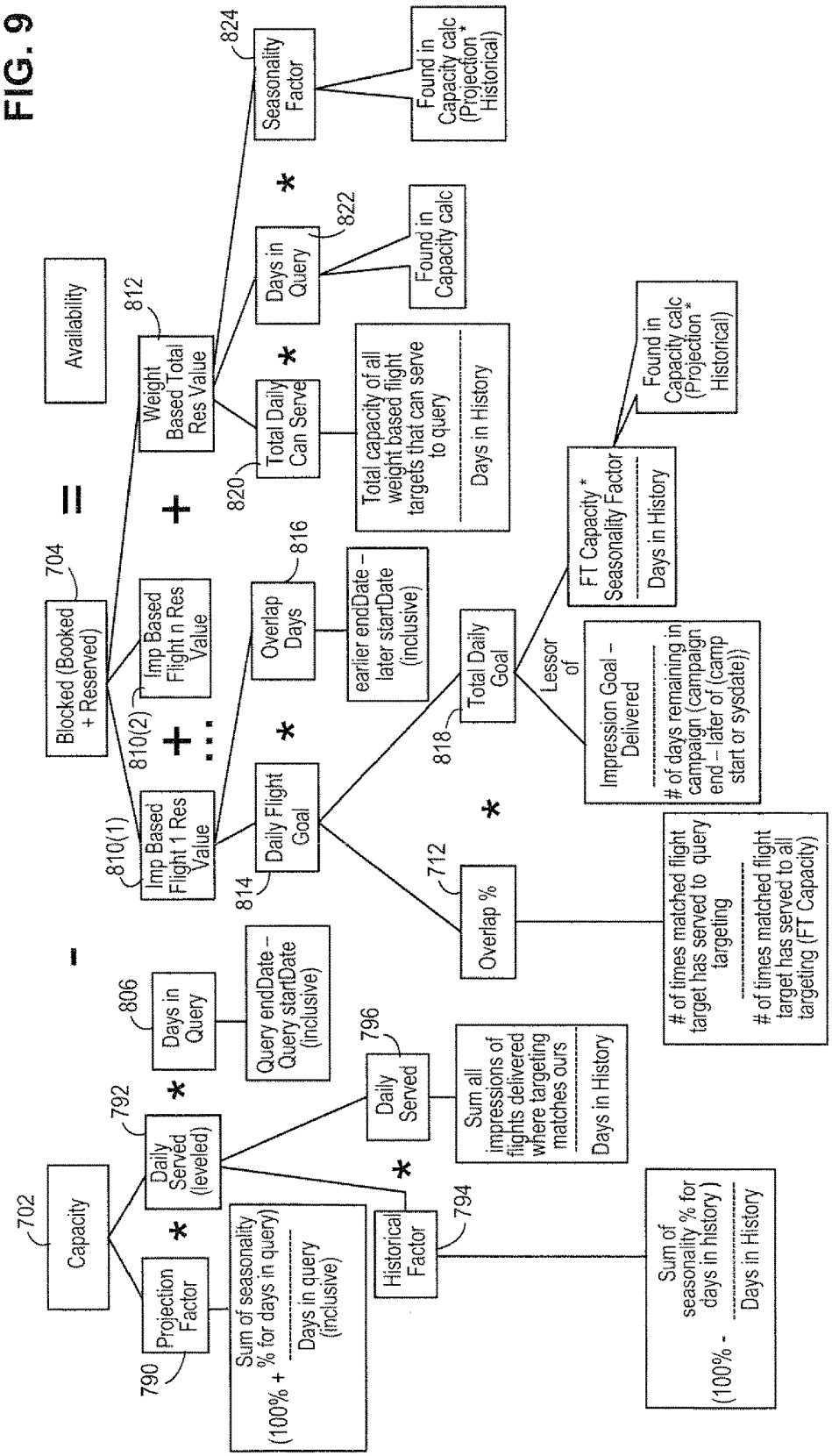
FIG. 9 shows an exemplary illustrative non-limiting algorithm providing logical inventory availability forecasting based on seasonality with total weight.

FIG. 9 shows a further exemplary illustrative non-limiting implementation of an algorithm providing logical inventory availability using seasonality with total weights. In the example shown in FIG. 9, a capacity is modified based on the number of days in the query (806). Impression based flight values 810 are modified through summation with a weight based total reserve value 812. The impression based flight reserve values 810 in turn are each calculated based upon a daily flight goal 814 multiplied by the number of overlap days 816. Overlap is determined as before (block 712) but is multiplied by a total daily goal 818 which may be calculated as the lesser of impression goal minus delivered/number of days remaining in campaign and capacity*seasonality factor/days in history. The weight based total reserved value may be calculated based upon the total daily that can be served 820 multiplied by the number of days in the query 822 and further multiplied by a seasonality factor 824. In this exemplary illustrative non-limiting implementation, it will be seen that seasonality adjusts both the capacity and the booked/reserve quantity for weight based flights. It is possible to average out the seasonality percentage across all the days that the user is querying for and apply this to the forecast as a lump sum. It should be noted that there is no knowledge of influence overlap on impression based flights (i.e., there are flights that do not overlap for the user's inquiry, but influence the impression based flights that do). For example, assume that flight A has priority 5, is weight based and targets a particular geographical market. Assume that flight B has a priority of 10, is impression based, and targets only that particular geographical market. If the user requests availability for that particular geographical market, flight B overlaps with the request while A does not but flight A nevertheless influences flight B in that flight B cannot serve to impressions that are already reserved to flight A. In addition, if a weight based flight is available to serve at any time during the requested query window, calculation will assume it can serve the entire window, and these weight based calculations or "blob" is a total only—based on the number booked by individual weight based flights not found only the total booked by all weight based flights. This total number may be displayed as a booked value on each weight based flight even if they should be in a reserve status.

Figure 10:
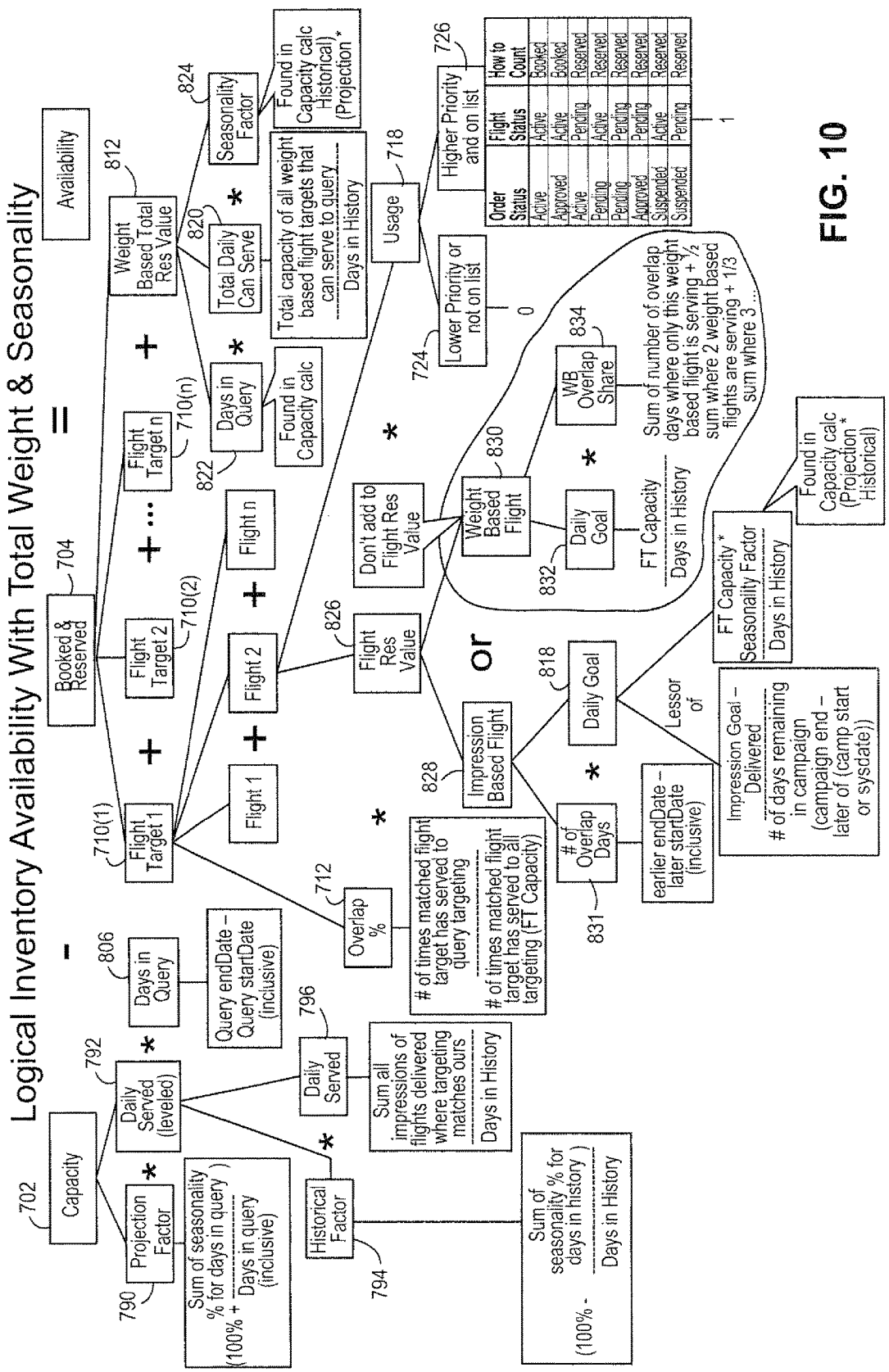
FIG. 10 shows an exemplary illustrative non-limiting algorithm for forecasting based on logical inventory availability with total weight and seasonality.

The exemplary illustrative non-limiting implementation shown in FIG. 10 provides a further additional calculations to provide logical inventory availability with total weight and seasonality. In this exemplary illustrative non-limiting implementation, the flight reserved value 826 is calculated based on either an impression based flight 828 or on a weight based flight 830. The impression based flight 828 may for example be determined based on the number of overlap days 831 multiplied by a daily goal (as explained above). Alternatively, for a weight based flight 830, the flight reserve value 828 may be calculated based upon a daily goal 832 (e.g., capacity/days in history) multiplied by a weight based overlap share 834 (e.g., the sum of number of overlap days where only this weight based flight is serving and ½ sum where two weight based flights are serving plus ⅓ sum where three weight based flights are serving, etc.). In this case, seasonality will adjust both the capacity and the booked/reserve quantity for weight based flights. It is possible to average out the seasonality percentage across all the days the user is querying for and apply this to the forecast as a lump sum.

While the technology herein has been described in connection with exemplary illustrative non-limiting implementations, the invention is not to be limited by the disclosure. For example, while the discussion above was illustrated with advertisements for cars, any kind of inventory can be managed using the techniques herein. The invention is intended to be defined by the claims and to cover all corresponding and equivalent arrangements whether or not specifically disclosed herein.

We claim:

1. A method of using at least one server computer comprising at least one computer processor operatively coupled to a database stored in at least one storage device, the at least one server computer being operatively coupled to a digital network, the at least one server computer executing software instructions stored in non-transitory memory and in accordance with said executing:
    (a) receiving query data from user computers over the digital network,
    (b) processing the query data received from user computers and automatically accessing, in said database, data transmissions matching the received and processed query data from user computers, and
    (c) delivering the matched data transmissions over the digital network to the user computers in response to the received query data,
    the method comprising:
    storing, in a memory device of a computer processor, historical advertising content delivery data comprising a record of a number of data transmissions the at least one server computer previously delivered in response to received user computer query data;
    with the computer processor coupled to the memory device and to the digital network, receiving user computer query data via the digital network and in response thereto, analyzing the stored data transmission delivery data to assess future capacity of at least one server computer to deliver data transmissions targeted in response to received user computer query data via the digital network;
    with the at least one processor, assessing already reserved data transmission deliveries based on reservations stored in the memory device;

with the at least one processor, forecasting availability of future opportunities for the at least one server computer to deliver data transmissions targeted in response to received user computer query data in response to said assessed future capacity and said assessed reserved deliveries, including the processor taking overlap situations into account, wherein an overlap situation occurs if a specific data transmission is responsive to more than one specific received user computer query data, and the at least one processor forecasts availability at least in part by the processor automatically calculating availability based on the number of times a specific data transmission has been delivered targeted to a specific user computer query data and the number of times the specific data transmission has been delivered to any targeting;

with the at least one processor, reserving additional data transmission delivery by storing reservations in the memory device in response at least in part to said forecasted availability; and using the at least one server computer, delivering targeted data transmissions to user computers over the digital network based at least in part on the forecasted availability and the reserved additional data transmission delivery.

2. The method of claim 1 further including the processor automatically simulating targeting in response to queries in order to assess said availability.

3. The method of claim 1 further including the processor automatically accounting for seasonality.

4. The method of claim 1 further including the processor automatically using a weighting factor to account for seasonality.

5. The method of claim 1 further including the processor automatically assessing said availability in response to total weight and seasonality.

6. A system for delivering data transmissions over a digital network in response to queries received from user computers, the system comprising:

a storage device storing a database containing actuals of historical data transmission delivery data based on previous user computer queries, the database containing both targeted data transmissions actually delivered and data transmissions that could have been delivered in a targeted manner;

at least one processor configured to run a scheduler that assesses reserved data transmission deliveries;

the at least one processor being further configured to execute a forecasting engine that forecasts availability of future delivery opportunities for delivering data transmissions targeted in response to received user computer queries, the forecasting engine taking overlap situations into account, wherein an overlap situation occurs if a specific data transmission is responsive to more than one specific user query, by the processor being structured and configured to automatically calculate availability based on both stored data transmissions actually delivered in a targeted manner to a specific user query and stored data transmissions that could have been delivered in a targeted manner to said specific user query;

said scheduler reserving, in a memory operatively coupled to the at least one processor, additional data transmission delivery in response at least in part to said forecasted availability; and a real time data transmission delivery computer server that delivers targeted data transmissions to user computers over the network at least in part in response to the additional data transmission delivery received by the scheduler.

7. The system of claim 6 further including a simulator that simulates real time data transmission delivery targeting in response to queries from user computers in order to assess said availability.

8. The system of claim 6 wherein said forecasting engine accounts for seasonality.

9. The system of claim 6 wherein said forecasting engine uses a weighting factor to account for seasonality.

10. The system of claim 6 wherein said forecasting engine assesses said availability in response to total weight and seasonality.

11. An inventory management system comprising:

a processor; and a memory coupled to said processor, said memory storing instructions that, when executed by said processor, control said processor to:

simulate real time data transmission delivery in response to queries received from user computers, the simulating being based at least in part on actual data transmissions delivered in response to previously received user queries, seasonality modeling and already-reserved and scheduled data transmissions; and forecast available inventory based at least in part on the results of said simulated real time data transmission delivery and historical delivery data, which represents data transmissions requested and served to user computers based on user computer queries, including taking overlap situations into account, wherein an overlap situation occurs if a specific data transmission is responsive to more than one specific user computer query, by the processor automatically calculating availability based on both logged targeted data transmissions actually delivered in a targeted manner to a specific user computer query and data transmissions that could have been delivered in a targeted manner to said specific user computer query.

12. A system for assessing unreserved capacity of real time data transmission delivery comprising:

a processor; and a memory coupled to said processor, said memory storing instructions that, when executed by said processor, control said processor to:

store an inventory management database including inventory of data transmissions already scheduled to be delivered and further store at least one overlap table, said processor deriving the overlap table at least in part from historical data of which data transmissions have been served by a server computer over a digital network to user computers in response to user computer interface events and could have been served to particular targeting requests; and simulate real time data transmission targeting based on actuals to assess, at least in part in response to the overlap table, the amount of targeting overlap between plural data transmissions that can be served to the same user interface event, wherein an overlap will occur if a specific data transmission is matched in response to more than one specific user interface event, and the processor automatically calculating a ratio of the number of times a data transmission has served targeted to a specific user interface event to the number of times the matched data transmission has served to any targeting.

13. A computer system comprising:

at least one server computer comprising at least one computer processor operatively coupled to a database stored in at least one storage device, the at least one server computer being operatively coupled to a digital network, the at least one server computer executing software instructions stored in non-transitory memory and in accordance with said executing:

(a) receiving query data from user computers over the digital network, (b) processing the query data received from user computers and automatically accessing, in said database, data transmissions matching the received and processed query data from user computers, and (c) delivering the matched data transmissions over the digital network to the user computers in real time response to the received query data, a memory device storing historical delivery data comprising a record of a number of data transmissions the at least one server computer previously delivered in response to received user computer query data; and the same or different processor being coupled to the memory device, the same or different processor executing instructions that perform the following:

(i) receive user computer query data and in response thereto, analyze the stored data transmission delivery data to assess future capacity of the at least one server computer to deliver data transmissions targeted in response to received user computer query data via the digital network;

(ii) assess already reserved data transmission deliveries based on reservations stored in the memory device;

(iii) forecast availability of future opportunities for the at least one server computer to deliver data transmissions targeted in response to received user computer query data in response to said assessed future capacity and said assessed reserved deliveries, including taking overlap into account, wherein overlap occurs if a specific data transmission is responsive to more than one specific received user computer query data, wherein the forecasting forecasts availability at least in part by calculating availability based on the number of times a specific data transmission has been delivered targeted to a specific user computer query data and the number of times the specific data transmission has been delivered to any targeting; and (iv) reserving additional data transmission delivery by storing reservations in the memory device in response at least in part to said forecasted availability; and wherein the at least one server computer is further configured to deliver targeted data transmissions to user computers over the digital network based at least in part on the forecasted availability and the reserved additional data transmission delivery.

* * * * *